United States Patent
Yu et al.

(10) Patent No.: US 9,225,970 B2
(45) Date of Patent: Dec. 29, 2015

(54) IMAGE DEPTH GENERATION DEVICE AND METHOD THEREOF

(71) Applicant: Realtek Semiconductor Corp., Hsinchu (TW)

(72) Inventors: Chia-Wei Yu, Taipei (TW); Chun-Hsing Hsieh, Hsinchu (TW); Hao-Ying Cheng, Hsinchu (TW); Hsu-Jung Tung, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 373 days.

(21) Appl. No.: 13/744,773

(22) Filed: Jan. 18, 2013

(65) Prior Publication Data
US 2013/0188027 A1    Jul. 25, 2013

(30) Foreign Application Priority Data
Jan. 20, 2012  (TW) .............................. 101102412 A (51) Int. Cl.
*H04N 13/04*    (2006.01)
*H04N 13/02*    (2006.01)

(52) U.S. Cl.
CPC ............. *H04N 13/04* (2013.01); *H04N 13/026* (2013.01); *H04N 13/0257* (2013.01)

(58) Field of Classification Search
CPC ............. H04N 13/0022; H04N 13/04; H04N 13/0257; H04N 13/026
USPC ............................................................ 348/51
See application file for complete search history.

(56) References Cited

U.S. PATENT DOCUMENTS 8,537,200 B2    9/2013  Zhang et al.
2004/0032980 A1*  2/2004  Harman ........................ 382/154

FOREIGN PATENT DOCUMENTS

TW    201130306 A1    9/2011

OTHER PUBLICATIONS

TW Office Action dated May 26, 2014.
Yasir Salih, Aamir S. Malik, Zazilah May, "Depth Estimation Using Monocular Cues from Single Image", 2011 National Postgraduate Conference (NPC), pp. 1-4, Sep. 19-20, 2011.

* cited by examiner

*Primary Examiner* — Michael Lee
(74) *Attorney, Agent, or Firm* — McClure, Qualey & Rodack, LLP (57) ABSTRACT

An image depth generation device and method thereof is disclosed in the present invention. The device includes at least a processing circuit and at least a calculator. The processing circuit receives an input image and determines a visual distance of a pixel Pi according to a color of the pixel in the input image and at least a reference value to generate a depth offset of each pixel. The calculator is coupled to the processing circuit and uses the depth offset of each pixel and a predetermined depth to generate an output depth value of each pixel in the input image.

18 Claims, 6 Drawing Sheets

IMAGE DEPTH GENERATION DEVICE AND METHOD THEREOF

CROSS-REFERENCE TO RELATED APPLICATION

The application claims the priority benefit of Taiwan application Ser. No. 101102412, filed Jan. 20, 2012, the full disclosure of which is incorporated herein by reference.

FIELD OF THE INVENTION

The invention relates to image devices, and more particularly, to an image depth generation device and method.

BACKGROUND OF THE INVENTION 3D (3-dimension) displays have recently become more and more popular, but lack of 3D content is a problem in the current market. Thus, there are methods for converting 2D image signals into 3D image signals.

Figure 1:
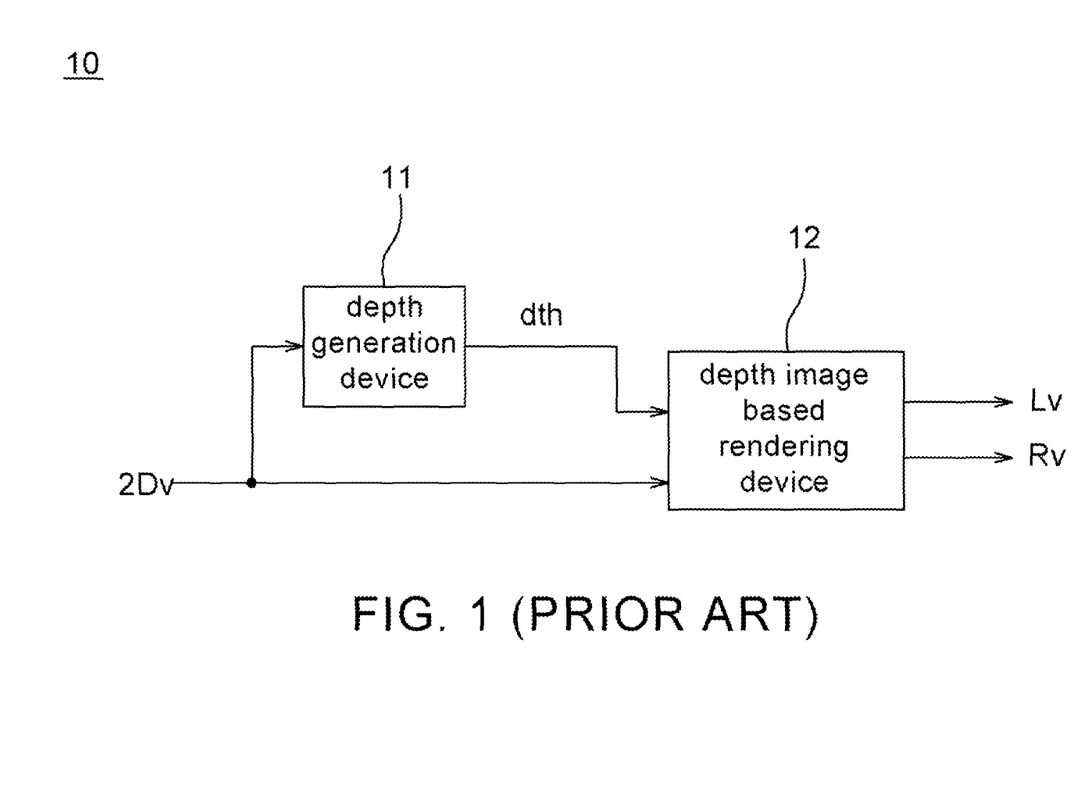
FIG. 1 is a diagram showing a conventional 3D image generation device 10.

FIG. 1 is a diagram illustrating a conventional 3D image generation device 10. In a conventional process of converting a 2D image into a 3D image, a depth generation device 11 is first used to estimate depth information dth from a 2D image signal 2Dv and then a depth image based rendering (DIBR) device 12 is used to generate a 3D image containing a Lv (left video) and a Rv (right video) according to the depth information dth.

The popular depth generation methods are listed as follows. (1) Video motion detection: determine a depth of an image pixel according to motion vectors (such as the techniques disclosed by U.S. Pat. No. 6,496,598). For example, when a camera makes a movement, a displacement of a near object is larger than that of a far object; therefore, a larger motion vector represents a nearer scene distance from the camera, and a smaller motion vector represents a farther scene distance from the camera. (2) Video edge characteristics detection (such as the techniques disclosed by US Publication No. 2007/0024614): determine an object boundary according to edges, and set different depth values for two boundary sides. (c) Disappeared lines and points detection: determine boundaries of a horizon or buildings according to disappeared lines and points, to thereby calculate a depth distribution of an image.

SUMMARY OF THE INVENTION

An object of the invention is to provide an image depth generation device and method thereof.

According to an embodiment of the invention, an image depth generation device is provided. The device includes at least a processing circuit and at least a calculator. The processing circuit receives an input image and determines a visual distance of a pixel Pi according to a color of the pixel in the input image and at least a reference value to generate a depth offset of each pixel. The calculator is coupled to the processing circuit and uses the depth offset of each pixel and a predetermined depth to generate an output depth value of each pixel in the input image.

According to an embodiment of the invention, an image depth generation device is provided. The device includes: a processing circuit for receiving an input image including a plurality of pixels and generating a depth offset of each pixel according to at least a parameter and colors of the plurality of pixels; and at least a calculator coupled to the processing circuit for generating an output depth value of each pixel for the input image according to the depth offset of each pixel and a predetermined depth.

According to an embodiment of the invention, an image depth generation method is provided. The method includes: receiving an input image including a plurality of pixels; designating a color for the input image and setting a depth offset corresponding to the color; and comparing a color of an input pixel of the input image with the designated color to determine a depth value of the input pixel according to the depth offset and similarity between the color of the input pixel and the designated color.

According to another embodiment of the invention, a video processing method is provided. The method includes: receiving a pixel with a plurality of image components; generating a depth offset by comparing the plurality of image components of the pixel with a plurality of reference values; and, adding up the depth offset and a predetermined depth to generate an output depth value.

In an embodiment of the invention, the image color is used to obtain depth values and the image details, to thereby control the depth value of each pixel. Further, in another embodiment of the invention, a designated color can be arbitrarily set according to demands so that the depth value of a color to be clearly revealed is changed and a 3D image with required display effects is effectively produced.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 2:
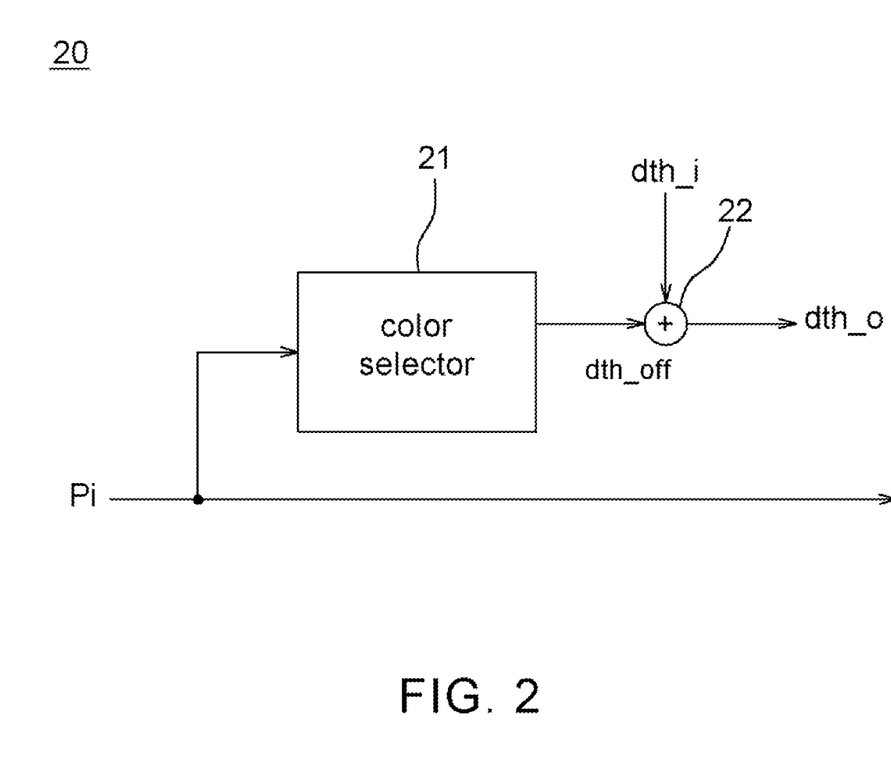
FIG. 2 shows a schematic diagram of an image depth generation device 20 according to one embodiment of the invention.

FIG. 2 shows a schematic diagram of an image depth generation device 20 according to an embodiment of the invention. The image depth generation device 20 includes a processing circuit 21 and a depth signal generator 22.

The processing circuit 21 receives an input image and determines a visual distance of a pixel Pi according to a color of the pixel Pi in the input image and at least a reference value to generate a depth offset dth_off for each pixel. The depth offset dth_off represents a difference between a color value of the pixel Pi and a predetermined color value. The depth offset dth_off may be positive or negative. Please note that the difference between the color value of the pixel Pi and the reference value determines if the pixel Pi is a foreground or a background of the input image (i.e., in the near part or the far part of a scene in the input image).

In an embodiment, the depth signal generator 22 may be implemented by an adder. The depth signal generator 22 uses the depth offset dth_off and a predetermined depth dth_i to generate an output depth value dth_o for each pixel Pi of the input image. The predetermined depth value dth_i may be designated by a designer or a system, and a foreground or a background is determined by the predetermined depth value dth_i. Besides, the predetermined depth value dth_i may be a constant or a gradation value, and it is adjustable.

In an embodiment, the depth signal generator 22 adds the depth offset dth_off and the predetermined depth dth_i to obtain the output depth value dth_o for the pixel Pi.

Please be noted that a designer can arbitrarily set the reference value, and the processing circuit 21 may further determine the depth offset dth_off for each pixel according to different demands. For example, if a blue color intends to be the background (such as the sky and the sea are blue), the depth offset of the blue color is set to a negative value so that the output depth value dth_o of the blue color is reduced after the depth offset and the predetermined depth value are added. If a skin color intends to be the foreground, the depth offset of the skin color is set to a positive value so that the output depth value dth_o of the skin color is increased after the depth offset and the predetermined depth value are added.

In this manner, the image depth generation device 20 of the invention can generate the output depth values dth_o for all the pixels of the input image so that a back-end circuit can use the output depth values dth_o to generate 3D (3-dimension) image signals, such as 3D image signals with left-eye and right-eye images.

Figure 3A:
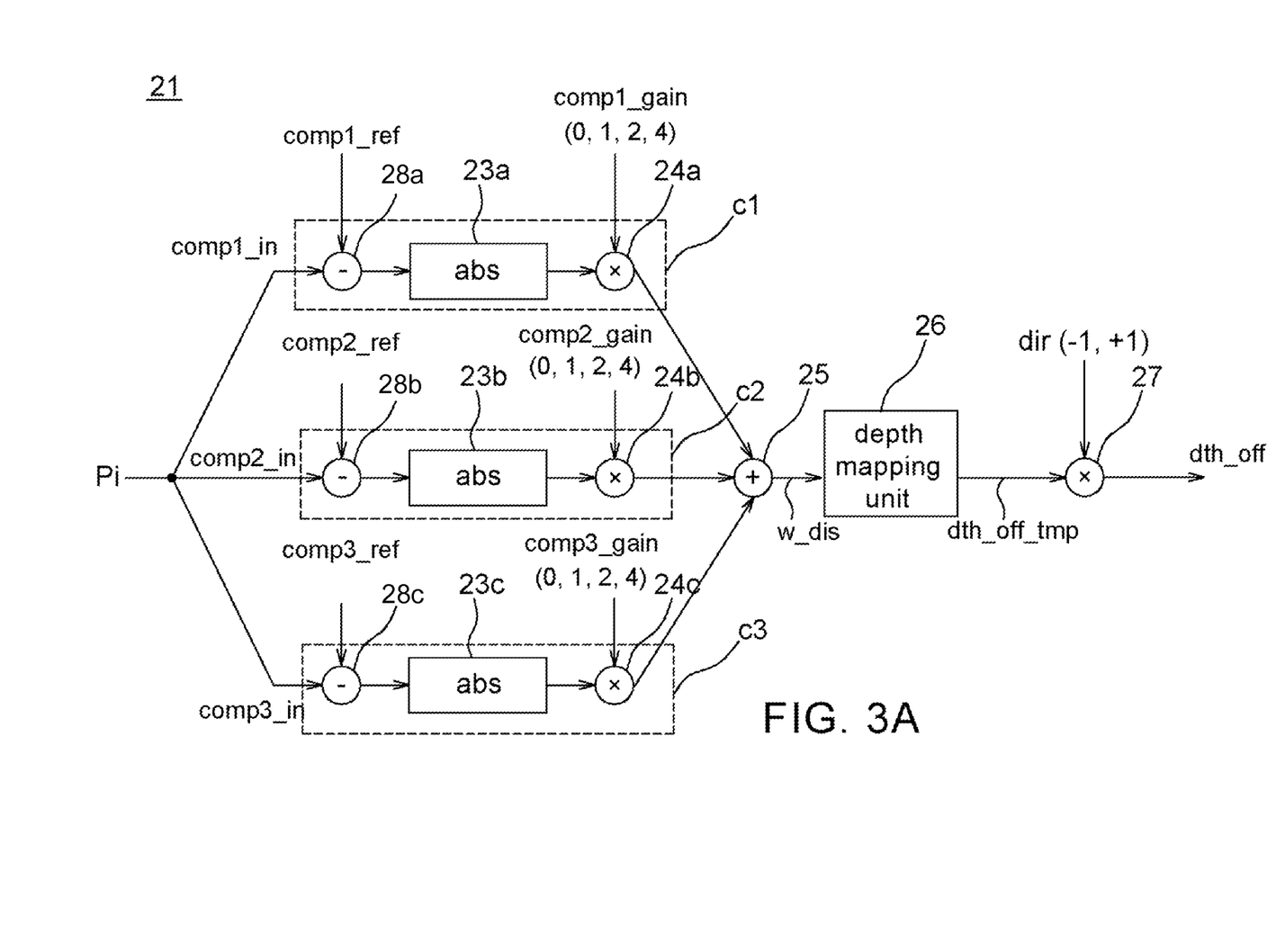
FIG. 3A shows a schematic diagram of the processing circuit 21 according to one embodiment of the invention.

FIG. 3A shows a schematic diagram of the processing circuit 21 according to an embodiment of the invention. The processing circuit 21 includes a plurality of calculating units c1, c2 and c3, a first calculator 25, a depth mapping unit 26, and a second calculator 27. Each of the calculating units c1, c2 and c3 calculates a difference value between one of image components of the pixel Pi and one of three reference values, and then the first calculator 25 adds up the three difference values to generate a weighted distance value w_dis. Please be noted that the image components are compliant with one of HSI (Hue, Saturation and Intensity), YUV (luminance and chrominance), YCbCr (luminance and color difference), and RGB (Red, Green and Blue) color formats. The above-mentioned color formats are merely examples, and not limitations of the invention. It should be understood that the image components are compliant with any existing or yet-to-be developed color formats.

As shown in FIG. 3A, assuming that the input pixel Pi includes three image components comp1_in, comp2_in and comp3_in. The calculating units c1, c2 and c3 compare the three image components comp1_in, comp2_in, and comp3_in of the pixel Pi with the reference values comp1_ref, comp2_ref and comp3_ref respectively to obtain the weighted distance value w_dis. Please note that the image components are not limited to the three above image components, and can be compliant with any existing or yet-to-be developed color formats (such as RGB, YUV, or the like).

In an embodiment, the calculating units c1, c2 and c3 respectively includes subtractors 28a, 28b and 28c, absolute-value calculating units 23a, 23b and 23c, and multipliers 24a, 24b and 24c. The subtractors 28a, 28b and 28c respectively subtract the three reference values (comp1_ref, comp2_ref and comp3_ref) associated with a designated color from the three components (comp1_in, comp2_in and comp3_in) of the input pixel Pi to obtain the difference values. Afterward, the absolute-value calculating units 23a~23c respectively generate three absolute values of the three difference values.

After that, the multipliers 24a~24c multiply the outputs of the absolute-value calculating units 23a~23c by three gain values comp1_gain, comp2_gain and comp3_gain respectively. Then the first calculator 25 adds up the outputs of the multipliers 24a~24c to obtain the weighted distance value w_dis.

Figure 3B:
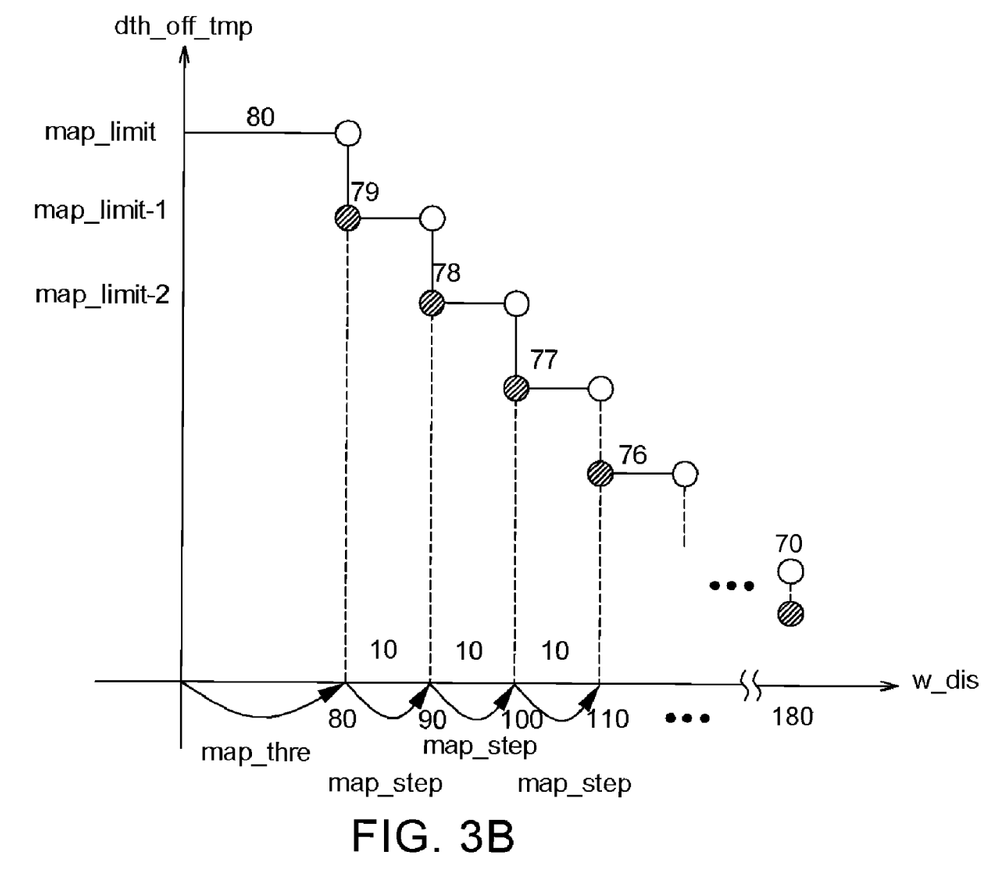
FIG. 3B shows an example of a converting table of weighted distance value and temporary depth offset.

The depth mapping unit 26 receives the weighted distance value w_dis and converts the weighted distance value w_dis into a temporary depth offset dth_off_temp according to a predetermined converting table. FIG. 3B shows an example of the converting table. As shown in FIG. 3B, after the depth mapping operation, the weighted distance value w_dis is converted into the temporary depth offset value dth_off_temp according to the converting table. In an embodiment, a mapping method is carried out as follows. The dth_off_temp value is set to map_limit when the weighted distance value w_dis value is less than a predetermined value map_thre. The dth_off_temp value is decreased by 1 from the map_limit value each time the w_dis value is increased by one mapping step map_step until the dth_off_temp value is reduced to 0 when the w_dis value is greater than the predetermined value map_thre.

The second calculator 27 may be implemented by a multiplier and may be used to set a sign (positive or negative) of the temporary depth offset dth_off_temp by a designer or a system. That is, the second calculator 27 multiplies the dth_off_temp value by either a positive value (set to a foreground) or a negative value (set to a background) to set a scene distance of the pixel Pi.

For example, assuming that the three input components comp1_in, Comp2_in and comp3_in of the input pixel Pi are 50, 50 and 110, the three reference values of a designated color are 10, 10 and 10, and the three gain values comp1_gain, comp2_gain and comp3_gain are 1, 1 and 1. Next, the subtractors 28a~28c perform subtraction operations and the absolute-value calculating units 23a, 23b and 23c produces the absolute values of the outputs of the subtractors 28a~28c, i.e., 40, 40 and 100. Then the multipliers 24a, 24b and 24c multiply the output values of the absolute-value calculating units 23a, 23b and 23c by the gain values 1, 1 and 1 respectively to obtain values 40, 40 and 100. The first calculator 25 adds up 40, 40 and 100 to obtain the weighted distance value w_dis of 180. After that, the depth mapping unit 26 receives the weighted distance value w_dis of 180, and performs a mapping operation according to the converting table. When the w_dis value is greater than the map_thre value, the dth_off_temp value is decreased by 1 from the map_limit value for each mapping step map_step increase on the w_dis axis until the dth_off_temp value is reduced to 0. Assuming that a size of each mapping step (map_step) is 10. Then a w_dis value of 90 corresponds to a dth_off_temp value of 79, a w_dis value of 100 corresponds to a dth_off_temp value of 78, . . . and therefore a w_dis value of 180 corresponds to a dth_off_temp value of 70. Finally, the sign of the temporary depth offset dth_off_temp is set by a designer or a system. For example, the current pixel Pi with a skin color intends to be set to a foreground and thus the second calculator 27 multiplies the temporary depth offset value dth_off_temp of 70 by (+1) to obtain the depth offset value depth_off of (+70).

Please be noted that the closer the dth_off_temp value of the input pixel Pi and the map_limit value, the closer the color of the input pixel Pi and the designated color; otherwise, the dth_off_temp value is closer to 0. The above data are just provided by way of example and not limitations of the invention. In another embodiment, the second calculator 27 can be omitted, and thus the depth offset dth_off is directly generated by the depth mapping unit 26.

Figure 4:
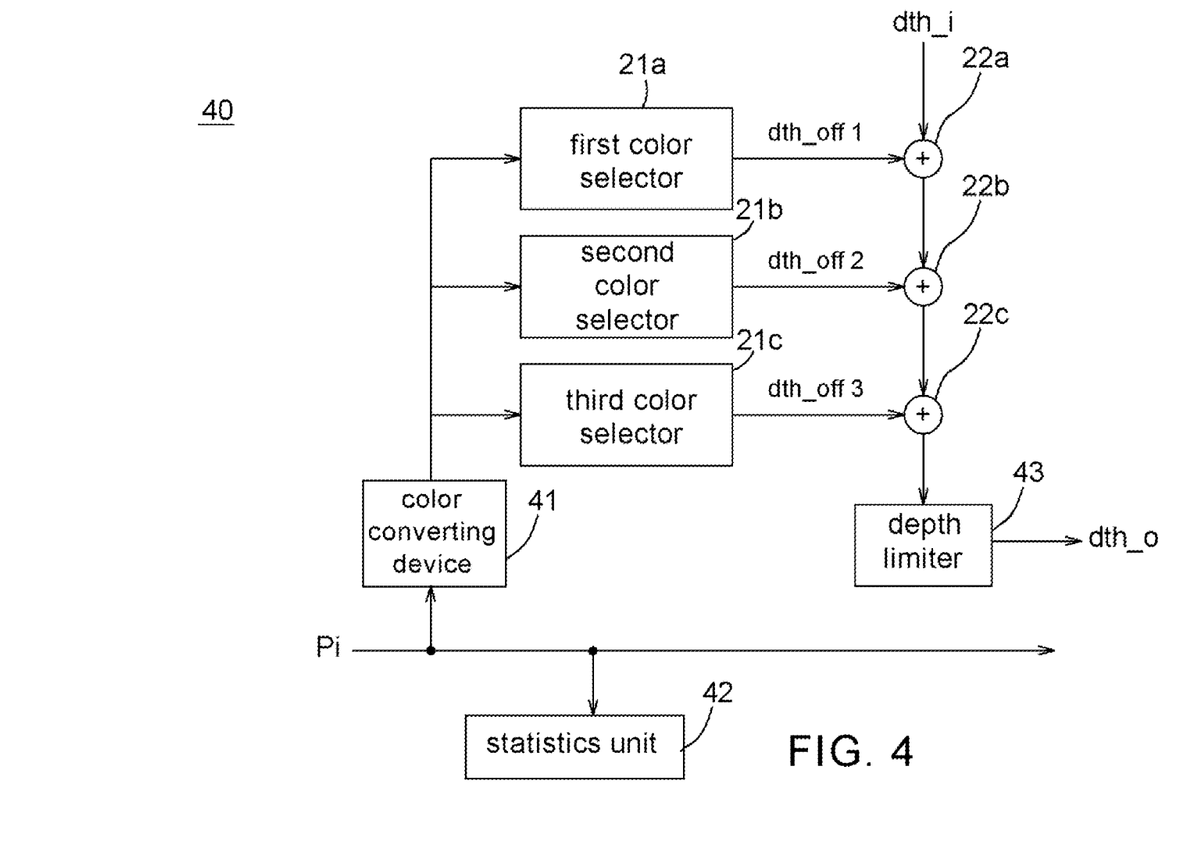
FIG. 4 shows a schematic diagram of an image depth generation device 40 according to another embodiment of the invention.

FIG. 4 shows a schematic diagram of an image depth generation device 40 according to another embodiment of the invention. The image depth generation device 40 includes a color converting device 41, a statistics unit 42, a depth limiter 43, three processing circuit 21a, 21b and 21c and three calculators 22a, 22b and 22c. The numbers of the processing circuits and the calculators included in the image depth generation device 40 are just provided by way of example and not limitations of the invention. The numbers of the processing circuits and the calculators can be changed according to demands. As shown in FIG. 4, the processing circuits 21a, 21b and 21c can use different sets of parameters. Each set of parameters includes three reference values (comp1_ref, comp2_ref and comp3_ref) of a designated color, gain values (comp1_gain, comp2_gain and comp3_gain), a mapping method, and a sign direction (dir). For example, a first processing circuit 21a can set a blue color as the designated color, and set the depth offset of the blue color by giving the mapping limit value map_limit; a second processing circuit 21b can set a green color as the designated color, and set the depth offset of the green color by giving the mapping limit value map_limit; a third processing circuit 21c can set a skin color as the designated color, and set the depth offset of the skin color by giving the mapping limit value map_limit. In this manner, depth adjustments can be respectively made to different color blocks. In another embodiment, the invention can use a weighted method in conjunction with the other depth generation algorithms. During operation, the color converting device 41 receives the pixel Pi and performs color transformation to allow a user to set the color parameters. Color transformation, for example, can convert an image from RGB color space into YCbCr color, and vice versa. Then, the processing circuits 21a, 21b and 21c (shown in FIG. 4 as first, second, and third color selectors), as also shown in FIGS. 3A and 3B, generate a plurality of the depth offsets dth_off. The calculators 22a, 22b and 22c add depth offsets dth_off_1, dth_off_2, dth_off_3, and the predetermined depth dth_i to generate an accumulated depth offset. Next, the depth limiter 43 receives the accumulated depth offset to generate an output depth offset dth_o. The depth limiter 43 sets limits on the accumulated depth offset to prevent the accumulated depth offset from being out of a system range. For example, a limited range of 0 to 255 is set by the depth limiter 43 on the accumulated depth offset to prevent the accumulated depth offset from overflow/underflow. Certainly, the above limited range is just provided by way of example and not limitation of the invention. The above limited range in the depth limiter can be set to any desired range according to different needs.

Besides, in the image depth generation device 40 of the invention, the statistics unit 42 receives the pixel Pi, and respectively performs statistics operations on the three image components of the whole image to generate three histograms. According to the three histograms, the image depth generation device 40 can make a finer setting on depth values to designate a corresponding color. For example, after statistics operations are performed, if the histograms show that the count of large green components in the lower part of the image is significantly greater than that in the upper part of the image, it is determined that the image contains lots of meadow. Then, the green color is selected as the designated color and a greater mapping limit value map_limit is set to define the greater depth offset of the green color. Please be noted that, in one embodiment, the statistics operations can be performed on different designated regions of the whole image respectively to obtain a plurality of histograms so that the depth values of the image can be organized more finely In this manner, the image depth generation device 40 of the embodiment of the invention uses the colors of the image pixels to obtain and process the image details, to thereby produce an extremely fine 3D image.

Figure 5:
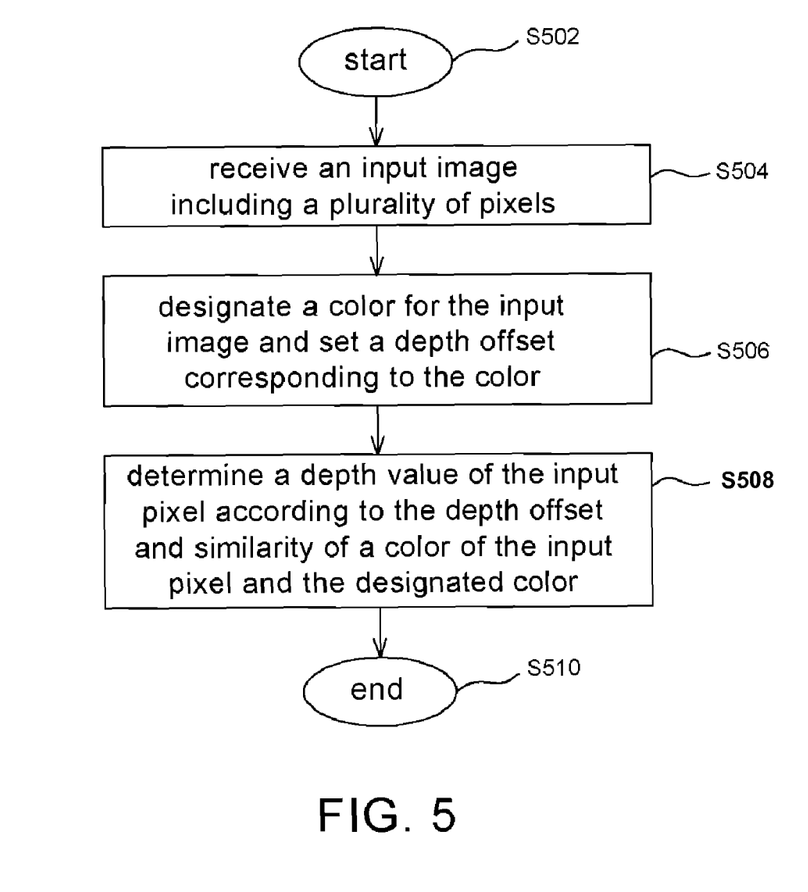
FIG. 5 shows a flow chart of an image depth generation method according to one embodiment of the invention.

FIG. 5 shows a flow chart of an image depth generation method according to one embodiment of the invention. The method includes the steps as follows.

Step S502: Start.

Step S504: Receive an input image including a plurality of pixels.

Step S506: Designate a color for the input image and set a depth offset corresponding to the color.

Step S508: Compare a color of the input pixel with the designated color for the input image, and determine a depth value of the input pixel according to the depth offset and similarity between the color of the input pixel and the designated color.

Step S510: End.

For example, assuming that a depth of the image is 8 bits in binary, a pixel with a depth value of 0 is set to the background and a pixel with a depth value of 255 is set to the foreground. If the designated color is set to a skin color with a depth value of 200, its corresponding depth offset is set to +200. Then, a determination is made according to color similarity. After a process of comparing the color of each input pixel with the skin color, depth values of pixels whose color are significantly different from the skin color are set to 0 and the pixels are set to the background of the input image. By contrast, the depth values of pixels whose color get closer to the skin color are set more closely to +200.

In this manner, according to one embodiment of the invention, image depth performance can be arbitrarily set according to image color characteristics and designer's demands, to effectively produce required image display effects. As the above embodiment, a human face and the skin are clearly revealed.

Furthermore, in one embodiment, if the sky or the sea is taken as background and meadow is taken as foreground, a depth value of a blue color can be set to a small or negative value and a depth value of a green color can be set to a large value to achieve predetermined display effects.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image depth generation apparatus, comprising:
    a processing circuit configured to receive an input image comprising a plurality of pixels and generate a depth offset of each pixel according to at least a parameter and colors of the plurality of pixels, wherein the processing circuit comprises at least one calculator configured to generate a weighted distance value according to differences between an image component of the pixel and the parameter, and a depth mapping unit configured to convert the weighted distance value according to a predetermined converting table to generate a temporary depth offset; and
    at least a calculator, coupled to the processing circuit, the calculator configured to generate an output depth value of each pixel according to the depth offset of each pixel.

2. The apparatus of claim 1, wherein the calculator is further configured to generate the output depth value according to a predetermined depth, wherein the predetermined depth corresponds to one of a plurality of colors and is either a constant or a gradation value.

3. The apparatus of claim 1, wherein the apparatus is further configured to determine the pixel of the input image belongs to a background or a foreground according to a difference between a color value of the pixel and the parameter.

4. The apparatus of claim 1, wherein the processing circuit further comprises a multiplier configured to multiply the temporary depth offset by a positive value or negative value to set a scene distance of the pixel.

5. The apparatus of claim 1, further comprising: a color converting circuit configured to receive the pixels of the input image and perform a color transformation on the pixels to determine a designated color of the input image.

6. The apparatus of claim 1, wherein the calculator is further configured to generate the output depth value according to a predetermined depth, wherein the predetermined depth is set according to the parameter and the parameter is determined according to a designated color.

7. The apparatus of claim 6, wherein the parameter comprises at least a reference value of the designated color, at least a gain value of the designated color, a mapping method designed for the designated color, and a sign associated with a direction of the depth offset of each pixel.

8. The apparatus of claim 6, further comprising: a plurality of processing circuits coupled to a plurality of calculators for generating a plurality of depth offsets.

9. The apparatus of claim 8, wherein the plurality of processing circuits are respectively set with different designated colors and different parameters.

10. The apparatus of claim 8, further comprising: a depth limiter configured to receive a sum of the plurality of depth offsets to set a limit on the sum of the depth offsets.

11. The apparatus of claim 1, further comprising: a statistics unit configured to perform a statistics operation according to a state of the input image to generate a histogram so that a designated color is determined.

12. The apparatus of claim 1, wherein each pixel comprises a plurality of image components and the parameter comprise a plurality of reference values, and wherein a number of the reference values correspond to a number of the image components.

13. An image depth generation apparatus, comprising:
a processing circuit configured to receive an input image comprising a plurality of pixels and generate a depth offset of each pixel according to at least a parameter and colors of the plurality of pixels; and
at least a calculator, coupled to the processing circuit, the calculator configured to generate an output depth value of each pixel according to the depth offset of each pixel, wherein the calculator is further configured to generate the output depth value according to a predetermined depth, wherein the predetermined depth is set according to the parameter and the parameter is determined according to a designated color.

14. The apparatus of claim 13, wherein the parameter comprises at least a reference value of the designated color, at least a gain value of the designated color, a mapping method designed for the designated color, and a sign associated with a direction of the depth offset of each pixel.

15. The apparatus of claim 13, further comprising: a plurality of processing circuits coupled to a plurality of calculators for generating a plurality of depth offsets.

16. The apparatus of claim 15, wherein the plurality of processing circuits are respectively set with different designated colors and different parameters.

17. The apparatus of claim 15, further comprising: a depth limiter configured to receive a sum of the plurality of depth offsets to set a limit on the sum of the depth offsets.

18. An image depth generation apparatus, comprising:
a processing circuit configured to receive an input image comprising a plurality of pixels and generate a depth offset of each pixel according to at least a parameter and colors of the plurality of pixels;
at least a calculator, coupled to the processing circuit, the calculator configured to generate an output depth value of each pixel according to the depth offset of each pixel; and
a statistics unit configured to perform a statistics operation according to a state of the input image to generate a histogram so that a designated color is determined.

* * * * *